Nov. 16, 1926.
E. H. HOBBS
1,606,996
DISK GAME OF CHANCE
Filed April 19, 1926
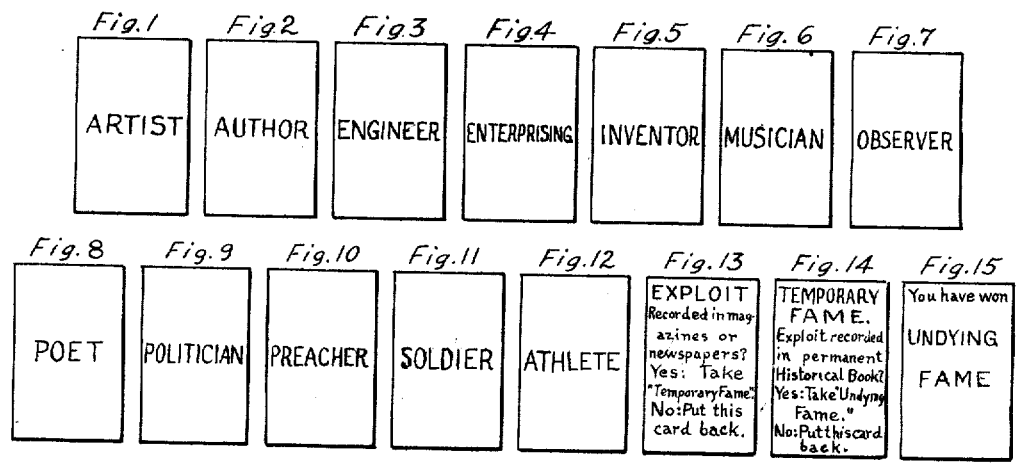
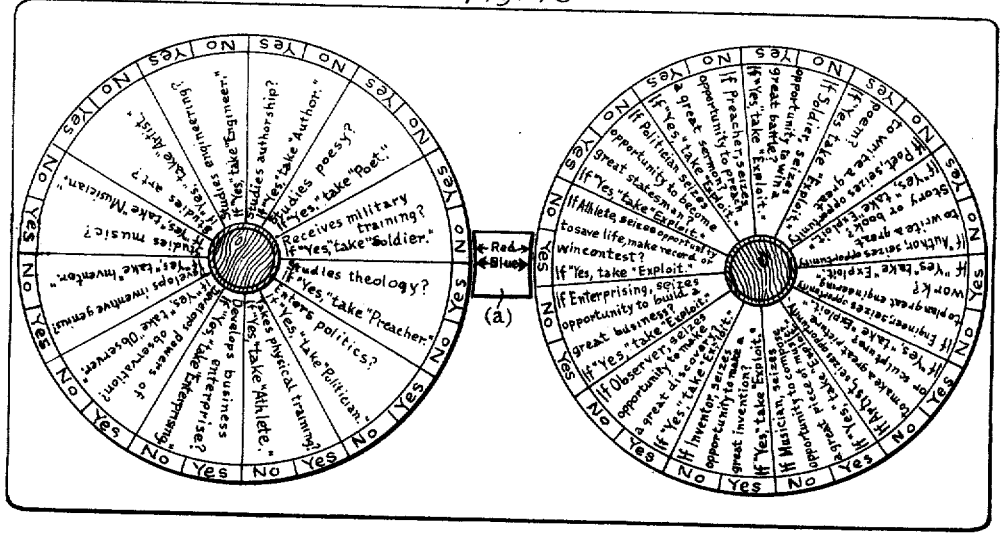
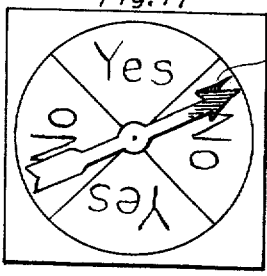
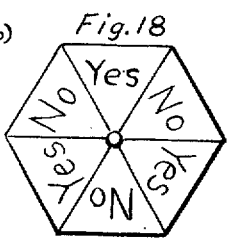
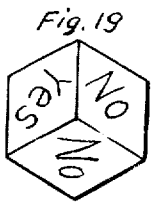
Inventor:
Ernest Haviland Hobbs.

Patented Nov. 16, 1926.

1,606,996

UNITED STATES PATENT OFFICE.

ERNEST HAVILAND HOBBS, OF WASHINGTON, DISTRICT OF COLUMBIA.

DISK GAME OF CHANCE.

Application filed April 19, 1926. Serial No. 103,058.

The object of my invention is to provide a game cheap and easy to manufacture, interesting and enjoyable to play, and which will impress upon children the great principle that achievement and accomplishment must be preceded by study or training and definite action in the seizing of opportunities. This is secured by a combination of the devices shown and described, reference being had to the accompanying drawing, in which Figs. 1 to 15 are tokens in the form of cards or blocks; Fig. 16 is a diagram of a board about 15 inches long, more or less, bearing two wheels or disks each divided into segments bearing wording, as shown, arranged to be spun by hand independently of each other, and a double pointer or indicator (a), as shown. Fig. 17 is a diagram of a spinner in the form of a board having a pointer mounted thereon, to be spun by hand. Fig. 18 is a diagram of a small top mounted on a peg to be twirled by the fingers. Figs. 19 and 20 are views of a die bearing the words "Yes" and "No". Only one of these "Yes-No" devices is needed. These elements cooperate with each other to form a complete playable game, as follows:

The left disk of Fig. 16 is the initial element, and provides, by spin and stop, a chance means for indicating, through the agency of the pointer, the study or training that must be undertaken as the first step toward fame. The second element is a qualifying chance means, for indicating whether it has been accomplished, yes or no. This is secured by the narrow ring around the edge of the disk, bearing in each segment the words "Yes" and "No", or by operating one of the "Yes-No" devices, Figs. 17 to 20. The third element is constituted of the tokens, Figs. 1 to 12. The player takes and holds the token representing the attribute he has acquired by the study or training previously indicated by spin and stop of the left-hand disk. The fourth element is the right-hand disk, which provides the opportunity to use the attribute or attributes held by the player. The fifth element is the same qualifying chance means as before described, to show whether the opportunity was seized, yes or no. The sixth, seventh and eighth elements are the tokens Figs. 13, 14 and 15, in connection with the aforesaid qualifying chance means. The game is won by securing the last token, Fig. 15.

In using the indicator (a) Fig. 16, if the blue pointer fails by pointing to a line, the red pointer is used. Means may be provided for preventing a disk from stopping on a line, instead of using the auxiliary pointer.

The game can be played by as many players as there are tokens for each attribute, say six. If there are six players, there should be six "Artist" tokens (because chance may cause each player to become an artist) and six of each of the other attribute tokens, Figs. 1 to 12, inclusive. The players take turns. Each player, in turn, spins one of the disks, operates one of the "Yes-No" devices, and obeys the wording on the disk or token, as indicated or taken. If the "Yes-No" ring is provided on the disks, the "Yes-No" dice or spinners are not used, unless the players prefer them. The results of play are that by operating the left-hand disk a few times, the player will acquire a few of the attribute tokens, which he retains until the end of the game. After having secured one or more of the attribute tokens, he can try, as his turns come, for an opportunity to use them, by spinning the right-hand disk. The more attributes he has, the greater are his chances for doing an exploit. When the chance of the spin and stop of the right-hand disk brings an attribute which he holds and he secures a "Yes," the player takes the Fig. 13 token and again spins or throws for a yes or no. If another "Yes" is secured, he takes the Fig. 14 token and again spins or throws for yes or no. If another "Yes" is secured, he takes the Fig. 15 token, winning the game.

It would be possible to make a playable game, using the same principles as herein described, by rearranging or substituting elements. For example, the tokens could be attached to the board; or the disks could be stationary with spinning pointers; or one disk be made smaller than the other and superimposed upon it; but it is believed that for practical purposes, as an article of manufacture and a playable game, the form shown in the drawing and described herein will be found the best and simplest.

I claim:—

1. A game comprising means for showing, by a double chance, the acquirement of an attribute, a certificate of said attribute, means for providing, by a double chance, an opportunity to use that attribute by performing an exploit, and means for showing, by chance, the acquirement of fame by the recording of said exploit.

2. A game comprising a board having two disks and two pointers mounted thereon, said disks having spaces arranged radially, said spaces containing indicia, the indicia in each space on one disk cooperating, through the medium of indicia on a token, with indicia in one of the spaces on the other disks to produce a result, tokens to act as cooperating mediums, as aforesaid, and a qualifying chance means to cooperate with the chance of spin and stop.

3. A game comprising a board having two disks mounted thereon, said disks having spaces arranged radially, said spaces containing indicia, the indicia in each space on one disk cooperating, through the medium of indicia on a token, with indicia in one of the spaces on the other disk to produce a result, means for indicating with certainty, by the chance of spin and stop, a space on either disk, tokens to act as cooperating mediums, as aforesaid, and a qualifying chance means to cooperate with the chance of spin and stop.

4. A game comprising a board having two disks mounted thereon, said disks having spaces arranged radially and containing indicia, the indicia in each space on one disk representing the acquirement of an attribute, and cooperating, through the medium of a token, bearing indicia representing such attribute, with indicia in a space on the other disk representing opportunity to use said attribute, to give the player a certain standing, means for indicating the chance of spin and stop a space on either disk, tokens to act as cooperating mediums, as aforesaid, and a qualifying chance means to cooperate with the chance of disk spin and stop, said qualifying means consisting of a device bearing affirmative and negative words and operated by chance to produce an affirmative or negative, and cooperating with affirmative and negative words in said spaces and on certain of said tokens.

ERNEST HAVILAND HOBBS.

ing, by chance, the acquirement of fame by the recording of said exploit.

2. A game comprising a board having two disks and two pointers mounted thereon, said disks having spaces arranged radially, said spaces containing indicia, the indicia in each space on one disk cooperating, through the medium of indicia on a token, with indicia in one of the spaces on the other disks to produce a result, tokens to act as cooperating mediums, as aforesaid, and a qualifying chance means to cooperate with the chance of spin and stop.

3. A game comprising a board having two disks mounted thereon, said disks having spaces arranged radially, said spaces containing indicia, the indicia in each space on one disk cooperating, through the medium of indicia on a token, with indicia in one of the spaces on the other disk to produce a result, means for indicating with certainty, by the chance of spin and stop, a space on either disk, tokens to act as cooperating mediums, as aforesaid, and a qualifying chance means to cooperate with the chance of spin and stop.

4. A game comprising a board having two disks mounted thereon, said disks having spaces arranged radially and containing indicia, the indicia in each space on one disk representing the acquirement of an attribute, and cooperating, through the medium of a token, bearing indicia representing such attribute, with indicia in a space on the other disk representing opportunity to use said attribute, to give the player a certain standing, means for indicating the chance of spin and stop a space on either disk, tokens to act as cooperating mediums, as aforesaid, and a qualifying chance means to cooperate with the chance of disk spin and stop, said qualifying means consisting of a device bearing affirmative and negative words and operated by chance to produce an affirmative or negative, and cooperating with affirmative and negative words in said spaces and on certain of said tokens.

ERNEST HAVILAND HOBBS.

Certificate of Correction.

It is hereby certified that in Letters Patent No. 1,606,996, granted November 16, 1926, upon the application of Ernest Haviland Hobbs, of Washington, District of Columbia, for an improvement in "Disk Games of Chance," errors appear in the printed specification requiring correction as follows: Page 2, line 10, claim 2, for the word "disks" read *disk;* same page, line 37, claim 4, for the article "the" read *by;* and that the said Letters Patent should be read with these corrections therein that the same may conform to the record of the case in the Patent Office.

Signed and sealed this 28th day of December, A. D. 1926.

[SEAL.]
M. J. MOORE,
*Acting Commissioner of Patents.*

Certificate of Correction.

It is hereby certified that in Letters Patent No. 1,606,996, granted November 16, 1926, upon the application of Ernest Haviland Hobbs, of Washington, District of Columbia, for an improvement in "Disk Games of Chance," errors appear in the printed specification requiring correction as follows: Page 2, line 10, claim 2, for the word "disks" read *disk;* same page, line 37, claim 4, for the article "the" read *by;* and that the said Letters Patent should be read with these corrections therein that the same may conform to the record of the case in the Patent Office.

Signed and sealed this 28th day of December, A. D. 1926.

[SEAL.]
M. J. MOORE,
*Acting Commissioner of Patents.*